(12) United States Patent
Sakai et al.

(10) Patent No.: US 11,281,942 B2
(45) Date of Patent: Mar. 22, 2022

(54) MACHINE LEARNING SYSTEM, DOMAIN CONVERSION DEVICE, AND MACHINE LEARNING METHOD

(71) Applicant: HITACHI, LTD., Tokyo (JP)

(72) Inventors: Ryo Sakai, Tokyo (JP); Nobutaka Kimura, Tokyo (JP); Takahiro Miki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 233 days.

(21) Appl. No.: 16/707,647

(22) Filed: Dec. 9, 2019

(65) Prior Publication Data

US 2020/0184269 A1 Jun. 11, 2020

(30) Foreign Application Priority Data

Dec. 11, 2018 (JP) .............................. JP2018-231333

(51) Int. Cl.
*G06K 9/62* (2022.01)
*G06T 7/50* (2017.01)
(Continued)

(52) U.S. Cl.
CPC ............. *G06K 9/6257* (2013.01); *G06N 5/04* (2013.01); *G06N 20/00* (2019.01); *G06T 7/50* (2017.01);
(Continued)

(58) Field of Classification Search
CPC ....................................................... G06K 9/62
(Continued)

(56) References Cited

U.S. PATENT DOCUMENTS 9,390,203 B2 * 7/2016 Miegel .................... G06F 30/00
11,126,891 B2 * 9/2021 St. Romain, II ..... G06N 3/0454
(Continued)

FOREIGN PATENT DOCUMENTS

JP 2018-063504 A 4/2018
WO WO2019/206792 * 10/2019 ............... G06K 9/46

OTHER PUBLICATIONS

Fernando Camaro Nogues et al: "Object Detection using Domain Randomization and Generative Adversarial Refinement of Synthetic Images", arxiv. org, Cornell University Library, 2010LIN Library Cornell University Ithaca, NY 14853, abstract; figure 2 (May 30, 2018).

(Continued)

*Primary Examiner* — Jerome Grant, II
(74) *Attorney, Agent, or Firm* — Volpe Koenig

(57) ABSTRACT

A machine learning system includes a first determination model that determines whether an input image is a second domain image, and a second determination model that determines whether an extracted image obtained by extracting an area where an object is presented from the input image is from the second domain image. Either a pseudo second domain image or the second domain image is selected and input into the first determination model, and either a first extracted image in the pseudo second domain image or a second extracted image in the second domain image is selected and input into an image extracting unit. Learning of the first determination model is performed based on a first determination result, learning of the second determination model is performed based on a second determination result, and learning of a pseudo image generative model is performed based on the first and second determination results.

5 Claims, 9 Drawing Sheets

(51) Int. Cl.
*G06T 7/70* (2017.01)
*G06N 20/00* (2019.01)
*G06N 5/04* (2006.01)

(52) U.S. Cl.
CPC ...... *G06T 7/70* (2017.01); *G06T 2207/10028* (2013.01); *G06T 2207/20081* (2013.01)

(58) Field of Classification Search
USPC ........................................................ 382/159
See application file for complete search history.

(56) References Cited

U.S. PATENT DOCUMENTS

| 2017/0092000 | A1* | 3/2017 | Schwimmer | H04N 13/204 |
| 2019/0258953 | A1* | 8/2019 | Lang | G06N 5/003 |
| 2020/0380085 | A1* | 12/2020 | Behrendt | G06F 30/15 |
| 2021/0241475 | A1* | 8/2021 | Kutulakos | G01B 11/2513 |

OTHER PUBLICATIONS

Extended European Search Report dated Apr. 23, 2020 for the European Patent Application No. 19215006.8.
Ashish Shrivastava, Tomas Pfister, Oncel Tuzel, Josh Susskind, Wenda Wang, Russ Webb, Apple Inc, "Learning from Simulated and Unsupervised Images through Adversarial Training".

* cited by examiner

MACHINE LEARNING SYSTEM, DOMAIN CONVERSION DEVICE, AND MACHINE LEARNING METHOD

CROSS-REFERENCE TO RELATED APPLICATIONS

The present application claims priority pursuant to 35 U.S.C. § 119 from Japanese Patent Application No. 2018-231333, filed on Dec. 11, 2018, the entire disclosure of which is incorporated herein by reference.

BACKGROUND

The present invention relates to a machine learning system, a domain conversion device, and a machine learning method.

JP-A-2018-63504 (Patent Literature 1) discloses a generative model learning method and a technique of preventing generation of data that is undesirable to a user. The generative model learning method includes a first learning step of learning a first generative model by unsupervised learning based on learning data prepared beforehand, a generation step of generating data by the first generative model, and a second learning step of learning a second generative model by supervised learning based on the learning data and the generated data determined as undesirable by a user.

Ashish Shrivastava, Tomas Pfister, Oncel Tuzel, Josh Susskind, Wenda Wang, Russ Webb, Apple Inc, "Learning from Simulated and Unsupervised Images through Adpoarial Training", Searched on Internet on Nov. 29, 2018 (Non-patent Literature 1) discloses a technique in which a Generative Adversarial Network (GAN) is used to reduce a gap between a synthetic image and an actual image by learning a model to improve the reality of an output of a simulator using actual data while preserving annotation information from the simulator.

Model learning in a machine learning system that performs image recognition requires a huge number of learning data. An example of a method for efficiently performing the model learning includes a model learning method in which learning data is used in a simulation environment obtained by simulating a field environment where a machine learning system is applied.

However, a state difference (a gap) between the simulation environment and the field environment may be a problem when applying the model learning method. A method to solve the above-mentioned difference includes a conversion (domain conversion) method for converting an image in the field environment to an image obtained by simulating an image in the simulation environment by a generative model (generator) of the Generative Adversarial Network (GAN). However, there is a room for improvement of conversion accuracy of the generative model in such a case.

An object of Patent Literature 1 is to prevent the generation of data that is undesirable to a user by the generative model, and the object does not include reducing a burden on the user such as preparation of learning data of the generative model.

SUMMARY

The invention has been made in view of the above problems, and an object thereof is to provide a machine learning system, a domain conversion device, and a machine learning method capable of efficiently performing model learning in which an image is domain-converted.

To achieve the above object, one aspect of the invention provides an information processing system (the machine learning system) that performs learning of a pseudo image generative model that is a machine learning model that converts a first domain image into a pseudo second domain image. The first domain image is an image in a first domain and is obtained by capturing an image for an object to be recognized and the pseudo second domain image is an image obtained by simulating a second domain image that is an image in a second domain. The information processing system includes a first determination model that determines whether an input image is the second domain image; a second determination model that determines whether an extracted image that is an image extracted from the input image based on area information specifying an area where an object is presented in the input image is an image extracted from the second domain image based on area information specifying an area where an object is presented in the second domain image; an image extracting unit that generates the extracted image and input the extracted image into the second determination model; a selection input unit that selects and inputs either the pseudo second domain image or the second domain image into the first determination model, and selects and inputs either a first combination of the pseudo second domain image and first area information that is the area information for the pseudo second domain image or a second combination of the second domain image and second area information that is the area information for the second domain image into the image extracting unit; and a learning processing unit that performs learning of the first determination model based on a first determination result that includes a result of a determination made by the first determination model and correct answer information for the determination, performs learning of the second determination model based on a second determination result that includes a result of a determination made by the second determination model and correct answer information for the determination, and performs learning of the pseudo image generative model based on the first determination result and the second determination result.

In addition, the problems disclosed in the application and methods for solving such problems will be clarified by the description of embodiments and drawings.

According to embodiments of the invention, the model learning in which an image is domain-converted can be efficiently performed.

DETAILED DESCRIPTION OF THE EMBODIMENTS

Hereinafter, embodiments will be described with reference to the drawings. In the following description, the same or similar components may be denoted by the same number, and a repetitive description thereof may be omitted.

Generally, learning of machine learning model (hereinafter, referred to as a "model") in a machine learning system that performs image recognition requires a huge number of learning data, and it takes a user a lot of efforts and time to prepare the learning data. For example, the user needs to prepare, as the learning data, a huge number of captured images corresponding to various states of an object in a field to which the machine learning system is applied, and needs to label the captured images (set correct answer information) in learning of a model (hereinafter, referred to as a "control model") that controls a robot arm while recognizing an object by image recognition.

An example of a method for efficiently performing model learning includes a method using a simulation environment obtained by simulating a field environment. However, in the method, even if an image in the field environment (hereinafter, referred to as a "field image") is directly input to a model, the model may not function correctly due to a state difference (domain difference) between the simulation environment and the field environment.

A method in which a model that is made to learn in the simulation environment also functions correctly in the field environment is considered to be a method in which data acquired in the field environment is converted into data simulating data in the simulation environment by a domain conversion device using a machine learning model (hereinafter, referred to as a "pseudo image generative model").

Specifically, for example, in a case of the above-described control model, the field image (hereinafter, referred to as a "first domain image") is converted into an image (hereinafter, referred to as a "pseudo second domain image") that simulates an image in the simulation environment (hereinafter, referred to as a "second domain image") by the domain conversion device that is configured with the machine learning model (hereinafter, referred to as a "pseudo image generative model"), and the pseudo second domain image is input into the control model.

However, a large number of learning data (a set of the first domain image and a label) used for the learning of the pseudo image generative model may need to be prepared in this method.

There is a method of using a generative model (generator) of the Generative Adversarial Network (GAN) as the pseudo image generative model.

Figure 1:
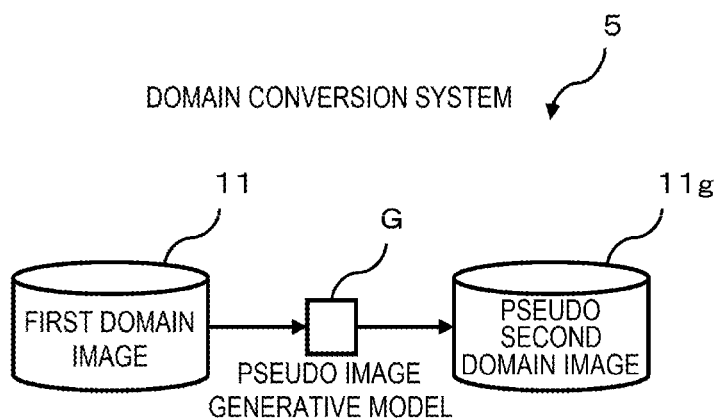
FIG. 1 is a diagram illustrating a domain conversion system.

FIG. 1 is a diagram illustrating a system (hereinafter, referred to as a "domain conversion system 5") that implements the above method. As illustrated in FIG. 1, the domain conversion system 5 converts a first domain image 11 into a pseudo second domain image 11g by a pseudo image generative model G generated as the generative model of the GAN.

Figure 2:
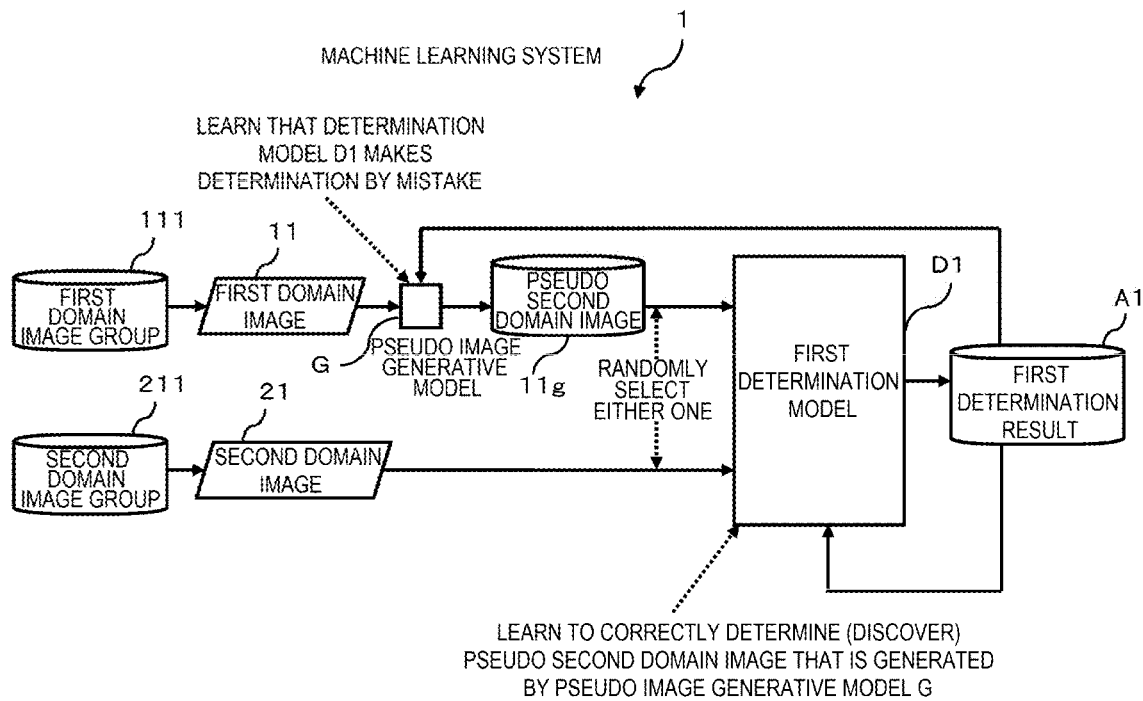
FIG. 2 is a diagram illustrating learning of a pseudo image generative model.

FIG. 2 is a diagram illustrating learning of the pseudo image generative model G. Similar to learning of a generative model of a general GAN, at a time of the learning of the pseudo image generative model G which is the generative model of the GAN, a determination model D (Discriminator) (hereinafter, referred to as a "first determination model D1") is used in addition to the pseudo image generative model G.

As illustrated in FIG. 2, one first domain image 11 selected from a first domain image group ill is input into the pseudo image generative model G. Either one pseudo second domain image 11g generated by the pseudo image generative model G or one (true) second domain image 21 selected from a second domain image group 211 is randomly selected and input into the first determination model D1.

The first determination model D1 determines whether an input image is the second domain image 21 (the true second domain image), and outputs a determination result (hereinafter, referred to as a "first determination result A1"). The first determination result A1 is a determination result of the first determination model D1, and includes information indicating whether the input image is similar to the second domain image (or information indicating a similarity degree) and information of a label (correct answer information indicating whether the input image is the pseudo second domain image or the second domain image 21).

The first determination result A1 is used in the learning of the pseudo image generative model G and learning of the first determination model D1. The pseudo image generative model G learns that the first determination model D1 determines that the input image is the second domain image 21 by mistake based on the first determination result A1. On the other hand, the first determination model D1 learns not to mistake the pseudo second domain image 11g generated by the pseudo image Generative model G for the second domain image based on the first determination result A1. Thus, accuracy of generating the pseudo second domain image 11g by the pseudo image generative model G and determination accuracy of the first determination model D1 is improved by learning in which the pseudo image generative model G and the first determination model D1 competes with each other. The learning of the pseudo image generative model G and the first determination model D1 is performed by a learning processing unit (not illustrated), which implements one of functions included in the machine learning system.

According to the method described above, the learning of the pseudo image generative model G can be performed by simply preparing the first domain image group 111 and the second domain image group 211 without labeling the first domain image 11.

In the learning of the pseudo image generative model according to the above-described method, the first domain image 11 randomly selected from the first domain image group 111 and the second domain image 21 randomly selected from the second domain image group 211 are provided as the learning data, respectively. Therefore, the pseudo image generative model G may generate the pseudo second domain image 11g (for example, an image causes noise when the control model described above recognizes an object) which is not expected at the beginning and in which, for example, an object that is not included in the first domain image is included in the pseudo second domain image 11g, or the like.

Here, an example of a method for preventing the learning of the pseudo image generative model G from being advanced in an undesirable direction includes a method for performing the learning of the pseudo image generative model G to reduce a difference between images before and after a conversion performed by the pseudo image generative model G.

Figure 3:
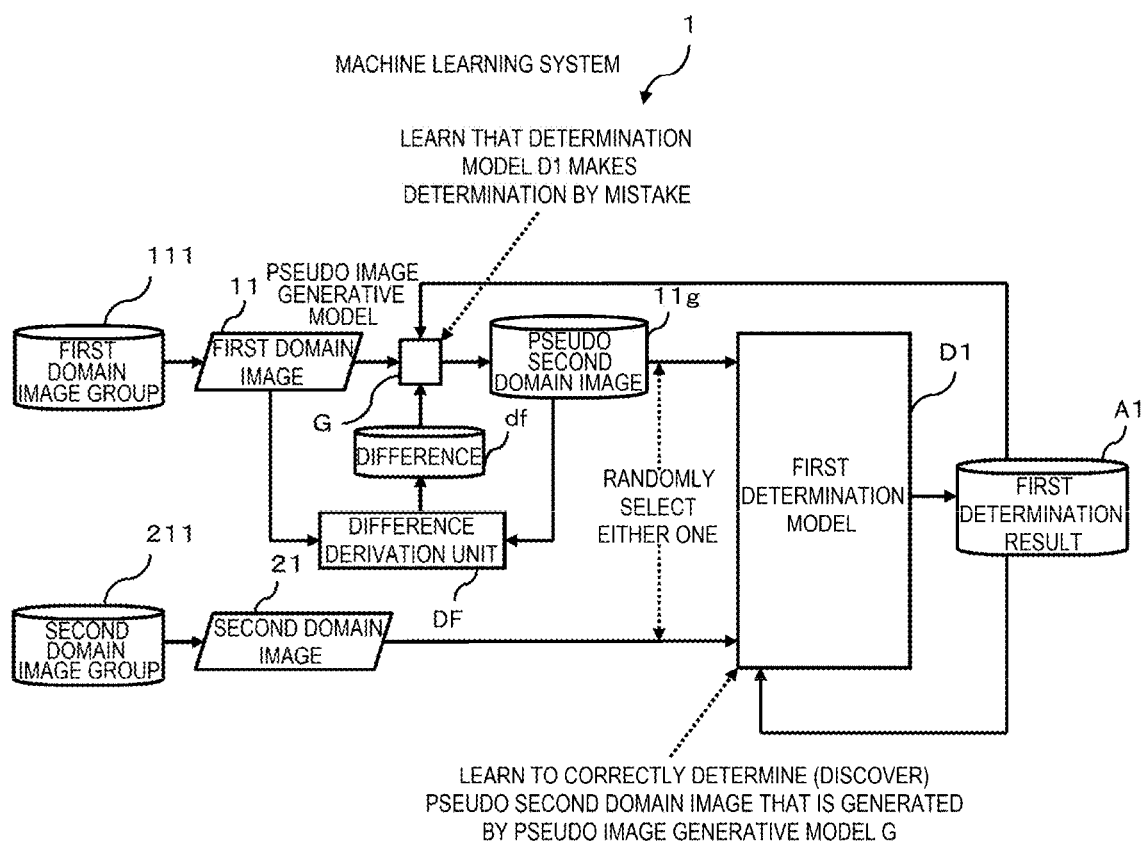
FIG. 3 is a diagram illustrating an example of a method for preventing the learning of the pseudo image generative model from being advanced in an undesired direction.

FIG. 3 is a diagram illustrating the method. As illustrated in FIG. 3, in the method, a difference derivation unit DF is provided to detect a difference between the first domain image 11 that is input into the pseudo image generative model G and the pseudo second domain image 11g generated by the pseudo image generative model G. The pseudo image generative model G is made to learn to reduce a difference df detected by the difference derivation unit DF. However, there is a problem in the method that it is not always easy to extract information useful for calculating the difference df from the images before and after the conversion performed by the pseudo image generative model G, or extract the difference df of abstract information from the images.

In view of the above problem, the present embodiment is to solve the problem described above according to the following method.

Figure 4:
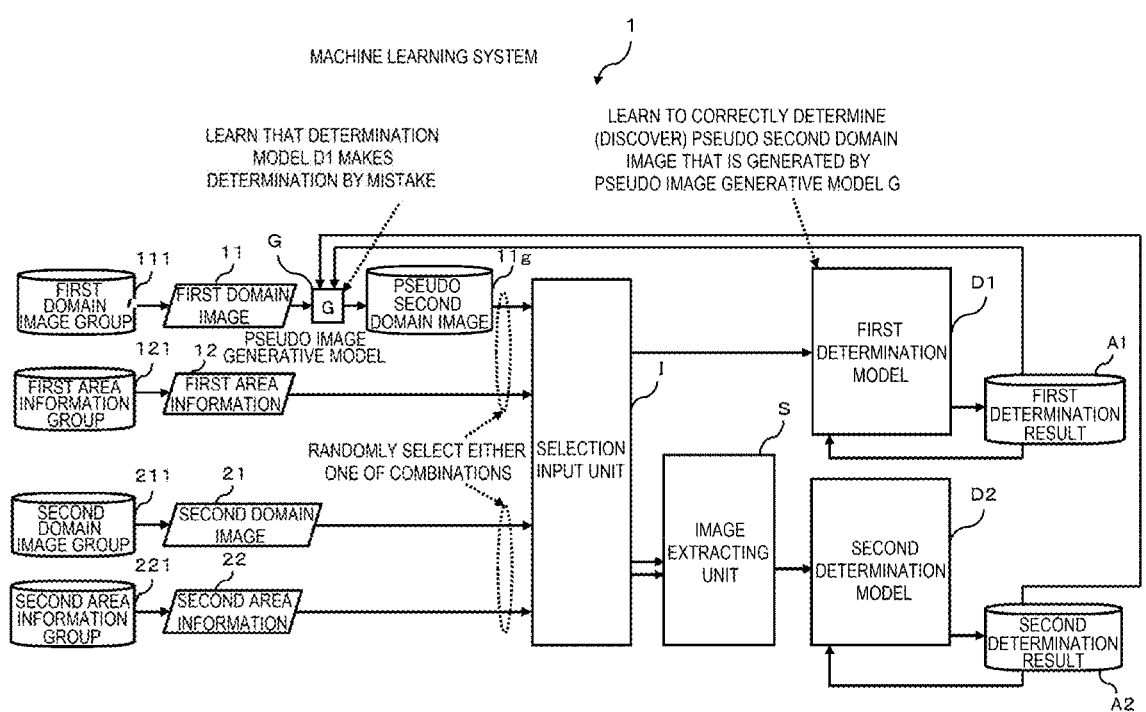
FIG. 4 is a block diagram illustrating a machine learning system.

FIG. 4 is a block diagram illustrating a main configuration of the machine learning system 1 configured to solve the above problem. The machine learning system 1 is, for example, an information processing system that learns a control model which controls a robot arm while recognizing an object to be recognized.

As illustrated in FIG. 4, the machine learning system 1 stores the first domain image group 111, a first area information group 121, the second domain image group 211, and a second area information group 221.

The first area information group 121 includes information (hereinafter, referred to as "first area information 12") used for specifying an area where an object is presented (that is, outline information of the area where the object is presented) in the first domain image 11. For the first domain image 11 acquired by, for example, an imaging device (for example, a depth camera, a TOF range image camera, and a stereo camera) capable of acquiring information about a distance (depth) to a subject, the first area information 12 can be obtained (generated) by comparing the distance with a threshold set with respect to the distance. For example, the first area information 12 can be acquired (generated) by using a known image processing technique for the first domain image 11.

The pseudo image generative model G shown in FIG. 4 converts one first domain image 11 selected from the first domain image group 111 into the pseudo second domain image 11g.

A combination of the pseudo second domain image 11g and the first area information 12 that is selected form the first area information group 121 and is relating to the first domain image 11 which is a conversion source of the pseudo second domain image 11g (hereinafter, referred to as a "first combination") is input into a selection input unit I.

A combination of the second domain image 21 selected from the second domain image group 211 and second area information 22 that is selected from the second area information group 221 and is relating to the second domain image 21 (hereinafter, referred to as a "second combination") is input into the selection input unit I.

The selection input unit I randomly selects either the first combination or the second combination, inputs the pseudo second domain image 11g or the second domain image 21 in the selected combination into the first determination model D1, and inputs the selected first combination or second combination into an image extracting unit S.

When the first combination is selected, the selection input unit I inputs the pseudo second domain image 11g in the combination into the first determination model D1, and inputs the pseudo second domain image 11g and the first area information 12 in the combination into the image extracting unit S. In this case, the image extracting unit S inputs an image (hereinafter, referred to as a "first extracted image 11c") obtained by extracting an area (an area where an object is presented) specified by the input first area information 12 from the input pseudo second domain image 11g, into a second determination model D2.

When the second combination is selected, the selection input unit I inputs the second domain image 21 in the combination into the first determination model D1, and inputs the second domain image 21 and the second area information 22 in the combination into the image extracting unit S. In this case, the image extracting unit S inputs an image (hereinafter, referred to as a "second extracted image 21c") obtained by extracting an area (an area where an object is presented) specified by the input second area information 22 from the input second domain image 21, into the second determination model D2.

The first determination model D1 determines whether the input image is the second domain image 21 (a true second domain image), and outputs the first determination result A1. The first determination model D1 learns not to mistake the pseudo second domain image 11g generated by the pseudo image generative model G for the second domain image based on the first determination result A1. On the other hand, the pseudo image generative model G learns that the first determination model D1 makes a determination by mistake (the pseudo second domain image 11g is erroneously determined as the second domain image) based on the first determination result A1. Learning of the pseudo image generative model G and the first and second determination models D1 and D2 is performed by the learning processing unit (not illustrated) which implements one of the functions included in the machine learning system.

The second determination model D2 determines whether the input image is the first extracted image 11c or the second extracted image 21c, and outputs a second determination result A2. The second determination model D2 learns to correctly determine whether the input image is the first extracted image 11c or the second extracted image 21c based on the second determination result A2. On the other hand, the pseudo image generative model G learns that the second determination model D2 makes a determination by mistake (the second determination model D2 erroneously determines the first extracted image 11c as the second extracted image 21c) based on the second determination result A2.

In this way, an operation that the second determination model D2 learns to correctly determine whether the input image is the first extracted image 11c or the second extracted image 21c is equal to an operation that the second determination model D2 learns in a direction of improving accuracy of recognizing an object included in the second extracted image 21c. Therefore, the accuracy of recognizing the object is improved as learning of the second determination model D2 is advanced. As a result, accuracy of determining whether a noise is included in the first extracted image 11c is improved. As described above, the second determination result A2 determined by the second determination model D2 with high accuracy is fed back to the learning of the pseudo image generative model G. As a result, the pseudo image generative model G learns in a direction of reducing a possibility of generating the pseudo second domain image

11g that is a noise at the time of recognizing an object and is not expected at the beginning.

Figure 5:
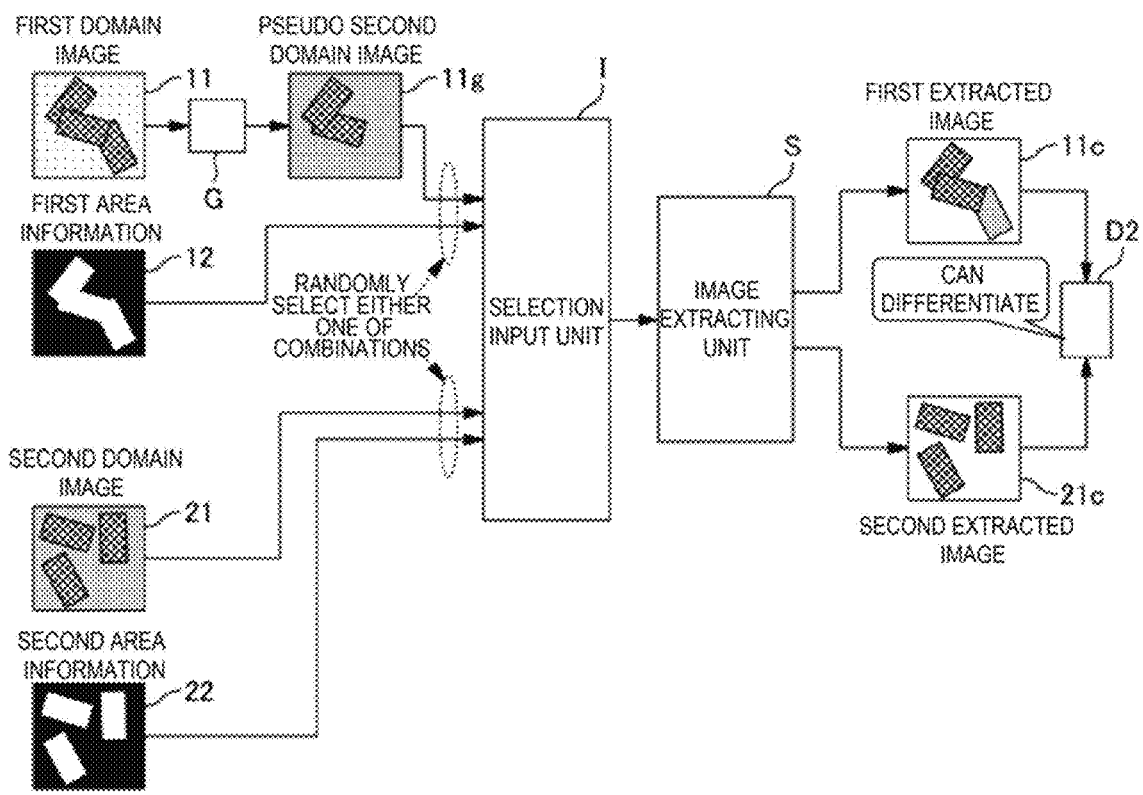
FIG. 5 is a diagram illustrating an operation of the machine learning system.

FIG. 5 is a diagram illustrating an operation of the machine learning system 1 illustrated in FIG. 4, and illustrating operations of the pseudo image generative model G and the second determination model D2 when the learning of the pseudo image generative model G is not advanced.

As illustrated in FIG. 5, the pseudo image generative model G whose learning is not advanced generates the pseudo second domain image 11g from which an object in the original first domain image 11 is erroneously removed. The second determination model D2 can correctly determine whether the first extracted image 11c or the second extracted image 21c is the pseudo second domain image 11g or the second domain image 21.

Figure 6:
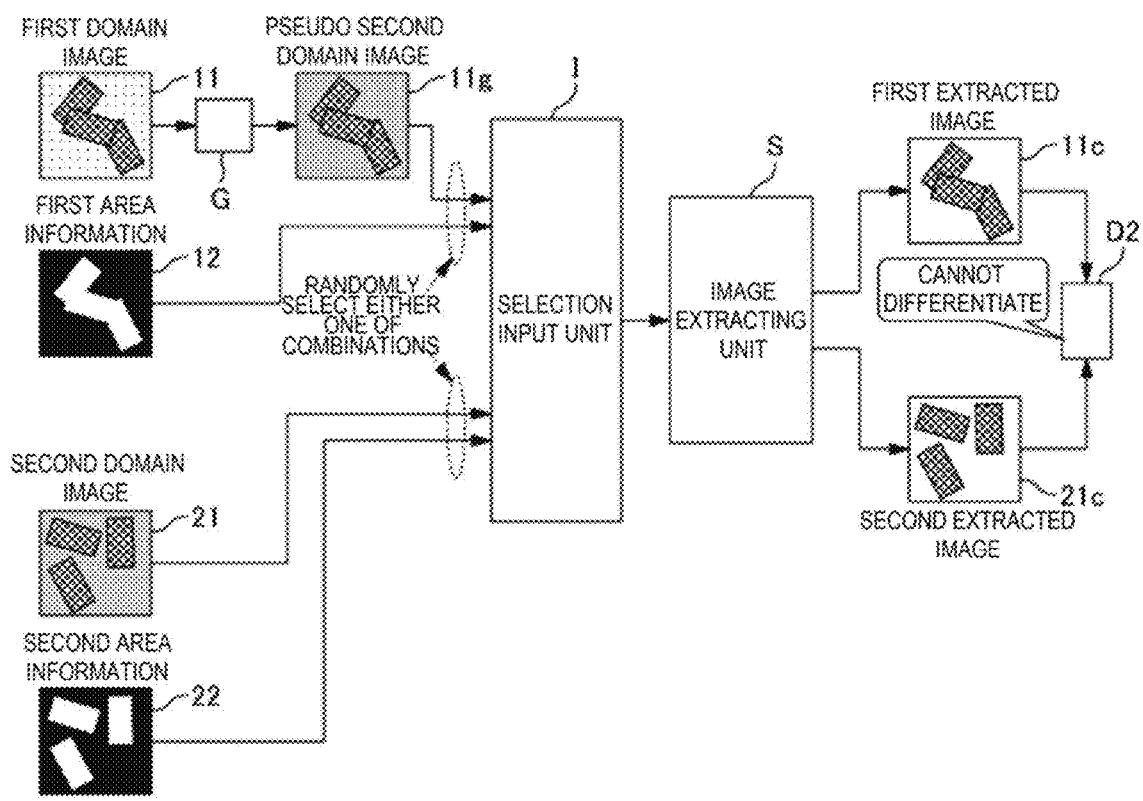
FIG. 6 is a diagram illustrating an operation of the machine learning system.

FIG. 6 is a diagram illustrating an operation of the machine learning system 1 illustrated in FIG. 4, and illustrating operations of the pseudo image generative model G and the second determination model D2 when the learning of the pseudo image generative model G is advanced.

As illustrated in FIG. 6, the pseudo image generative model G whose learning is advanced generates the pseudo second domain image 11g while maintaining information of the object in the original first domain image. The second determination model D2 cannot correctly determine whether the first extracted image 11c or the second extracted image 21c is the pseudo second domain image 11g or the second domain image 21.

Although examples illustrated in FIGS. 5 and 6 illustrates a case where the image extracting unit S extracts an "area where an object is presented" from an original image (the pseudo second domain image 11g or the second domain image 21), the image extracting unit S may extract an "area where the object is not presented" from the original image. If the "area where the object is not presented" is extracted, the pseudo image generative model G can deal with a case where an object that is not included in the original first domain image 11 is erroneously drawn in the "area where the object is not presented" of the original image. Hereinafter, a configuration of the machine learning system 1 in such a case will be described with reference to the drawings.

Figure 7:
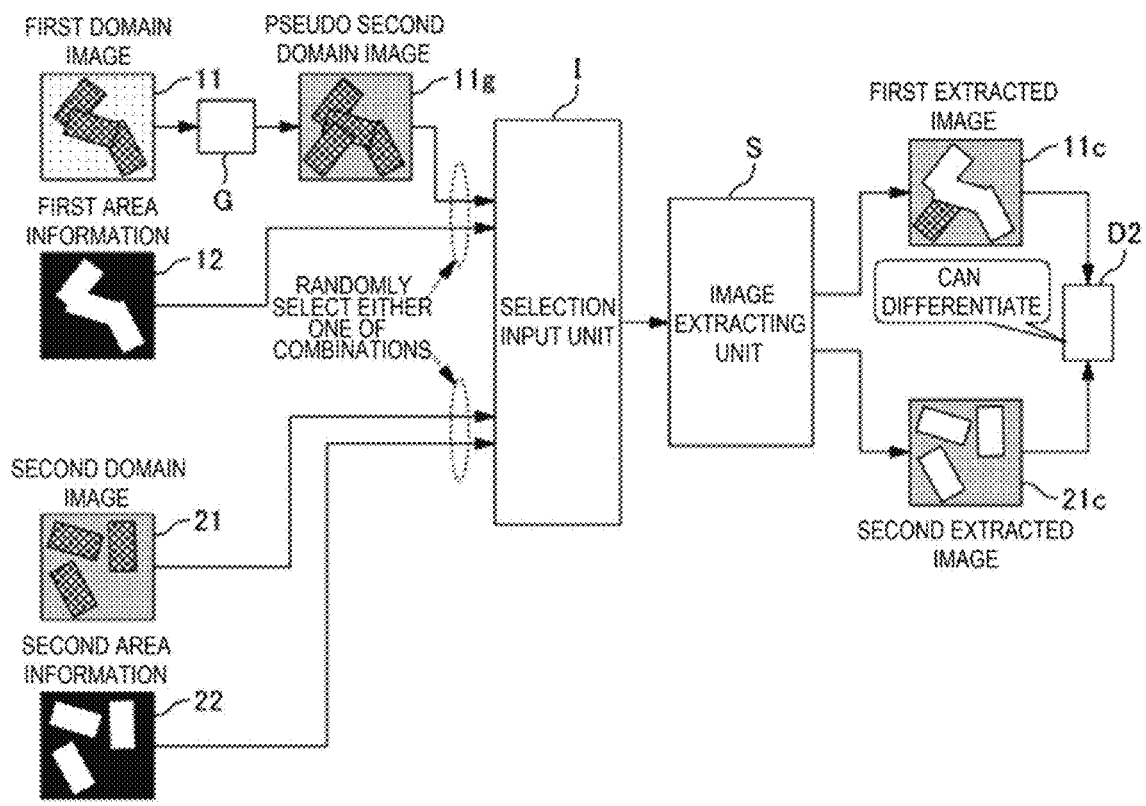
FIG. 7 is a diagram illustrating an operation of the machine learning system.

FIG. 7 is a diagram illustrating, in a case where the image extracting unit S extracts the "area where the object is not presented" from the original image (the pseudo second domain image 11g or the second domain image 21), an operation of the machine learning system 1 illustrated in FIG. 4 and illustrating operations of the pseudo image generative model G and the second determination model D2 at a stage in which the learning of the pseudo image generative model G is not advanced.

As illustrated in FIG. 7, the pseudo image generative model G whose learning is not advanced generates a pseudo second domain image 11g in which an object that is not presented in the original first domain image 11 is erroneously added. The second determination model D2 can correctly determine whether the first extracted image 11c or the second extracted image 21c is the pseudo second domain image 11g or the second domain image 21.

Figure 8:
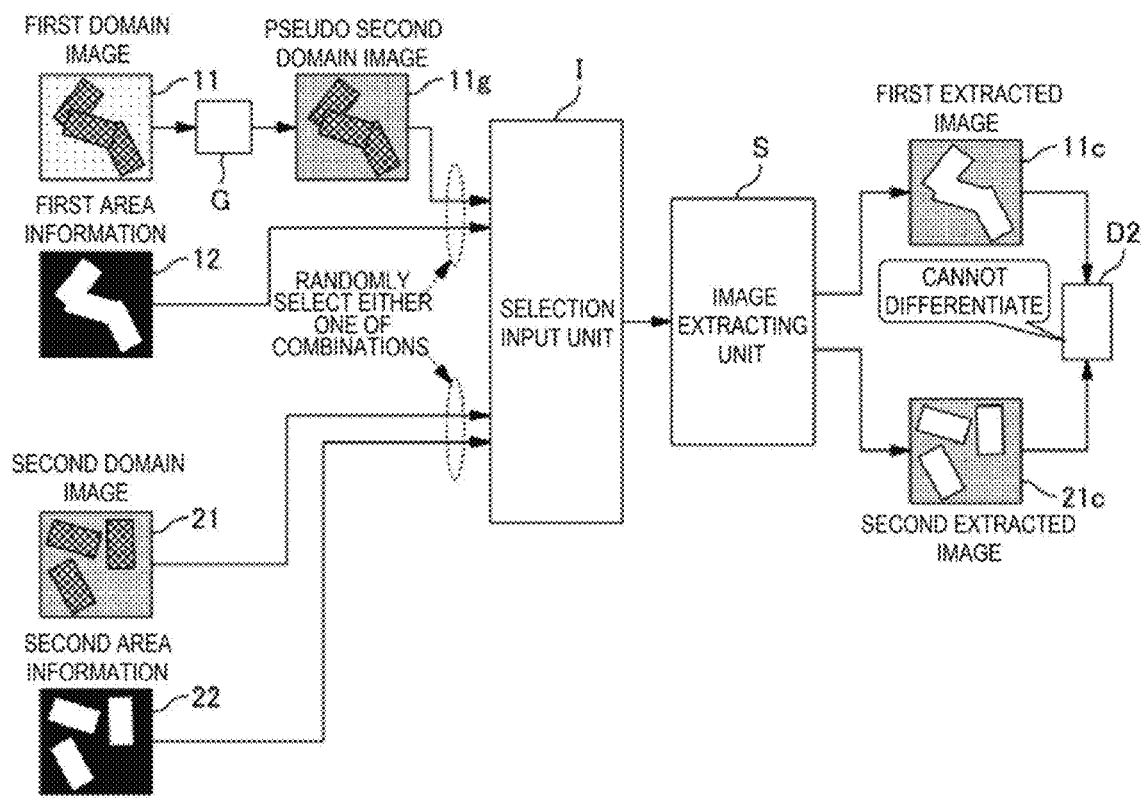
FIG. 8 is a diagram illustrating an operation of the machine learning system.

FIG. 8 is a diagram illustrating, in a case where the image extracting unit S extracts the "area where the object is not presented" from the original image (the pseudo second domain image 11g or the second domain image 21), an operation of the machine learning system 1 illustrated in FIG. 4 and illustrating operations of the pseudo image generative model G and the second determination model D2 at a stage in which the learning of the pseudo image generative model G is advanced.

As illustrated in FIG. 8, the pseudo image generative model G whose learning is advanced generates the pseudo second domain image 11g while maintaining the information of the object in the original first domain image 11 (without adding the object or the like). The second determination model D2 cannot correctly determine whether the pseudo second domain image 11g is the second domain image.

Two cases which are a case where the image extracting unit S extracts the "area where the object is presented" from the original image (the pseudo second domain image or the second domain image 21) and a case where the image extracting unit S extracts the "area where the object is not presented" have been described above. Although the image extracting unit S only performs extracting in one of the two cases in the above description, the image extracting unit S may perform extracting in both cases at the same time.

Figure 9:
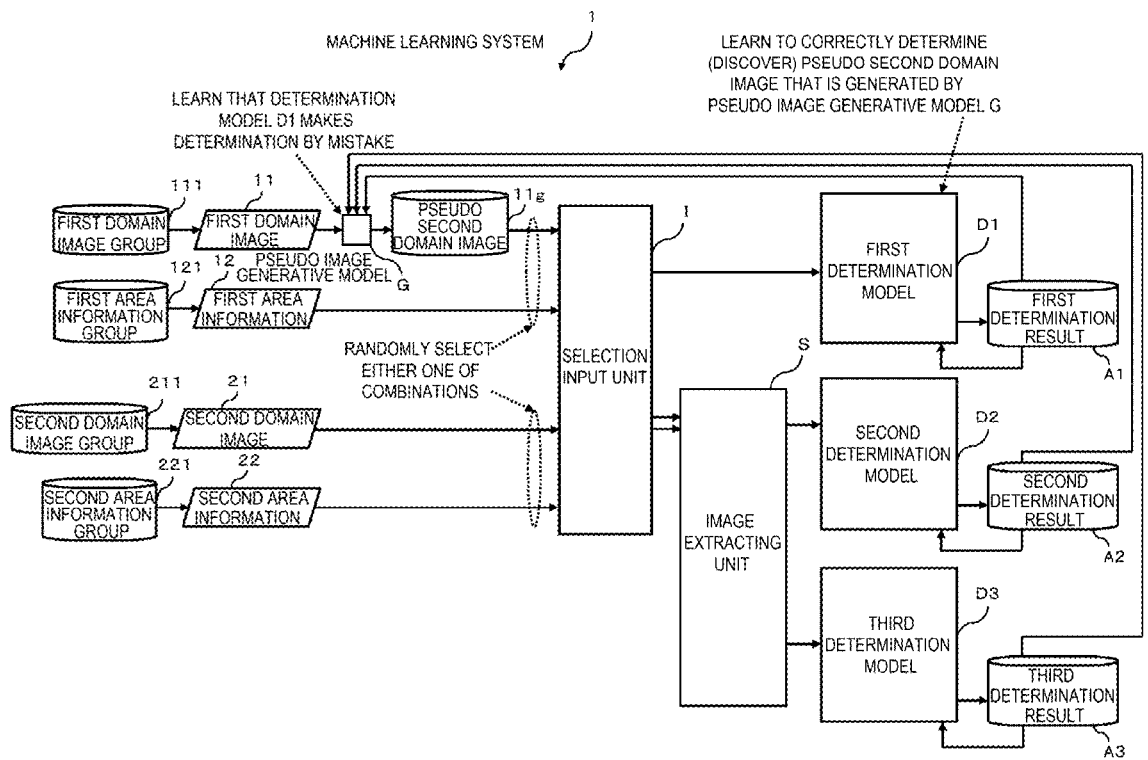
FIG. 9 is a block diagram illustrating the machine learning system.

FIG. 9 is a block diagram of the machine learning system 1 with such a configuration. As illustrated in FIG. 9, the machine learning system 1 is formed by adding a third determination model D3 that makes a determination on an extracted image obtained by the image extracting unit S extracting the "area where the object is not presented" to the configuration of the machine learning system 1 illustrated in FIG. 4. With such a configuration of the machine learning system 1, the pseudo image generative model G can generate the pseudo second domain image 11g with higher accuracy. Learning of the pseudo image generative model G and the first to third determination models D1 to D3 is performed by the learning processing unit (not illustrated) which implements one of the functions included in the machine learning system 1.

The added third determination model D3 determines whether an image (hereinafter, referred to as a "first extracted image 11c'") obtained by extracting an area (an area where an object is not presented) specified by the first area information 12 is an image (hereinafter, referred to as a "second extracted image 21c'") obtained by extracting an area (an area where an object is not presented) specified by the second area information 22, and outputs a third determination result A3. The third determination model D3 learns to correctly determine whether the input image is the first extracted image 11c' or the second extracted image 21c' based on the third determination result A3. On the other hand, the pseudo image generative model G learns that the third determination model D3 makes a determination by mistake based on the third determination result, that is the third determination model D3 erroneously determines that the first extracted image 11c' is the second extracted image 21c'.

Thus, the pseudo image generative model performs learning based on the second determination result A2 and the third determination result A3, in addition to the first determination result A1, so that the pseudo image generative model G can be reliably prevented from generating the pseudo second domain image 11g that is a noise at the time of recognizing an object and is not expected at the beginning, and the pseudo image generative model G can be made to efficiently learn to generate the pseudo second domain image 11g with high accuracy.

Figure 10:
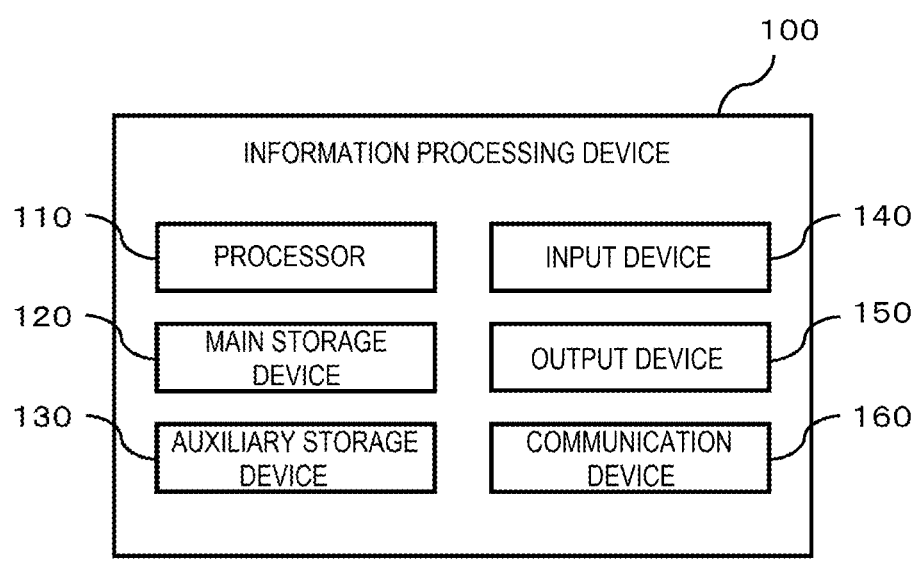
FIG. 10 shows an example of an information processing device used at the time of configuring the machine learning system.

FIG. 10 illustrates an example of hardware of the information processing device (computer) used for implementing the machine learning system 1 including the configuration illustrated in FIGS. 1, 4, and 9.

As illustrated in FIG. 10, an information processing device 100 in the example includes a processor 110, a main storage device 120, an auxiliary storage device 130, an input device 140, an output device 150, and a communication device 160. The devices are communicably connected to one other via a communication unit such as a bus (not illustrated).

The information processing device 100 may be, for example, a part of another system to which the machine learning system is applied such as a microcomputer mounted on a robot arm (a manipulator). The information processing device 100 may be, for example, implemented by using a virtual information processing resource such as a cloud server provided by a cloud system.

The processor 110 includes, for example, a Central Processing Unit (CPU), a Micro Processing Unit (MPU), a Field-Programmable Gate Array (FPGA), a Graphics Processing Unit (GPU), and an AI chip.

The main storage device 120 is a device that stores a program or data, and is, for example, a Read Only Memory (ROM), a Random Access Memory (RAM), a Non Volatile Memory (that is, a Non Volatile RAM (NVRAM)).

The auxiliary storage device 130 is, for example, a hard disc drive, a Solid State Drive (SSD), an optical storage device (such as a Compact Disc (CD), a Digital Versatile Disc (DVD)), a storage system, an IC card, a reading and writing device of a recording medium such as an SD card or an optical recording medium, and a storage domain of a cloud server. A program or data can be read into the auxiliary storage device 130 via a reading device of a recording medium or the communication device 160. The program and data stored in the auxiliary storage device 130 are read into the main storage device 120 as needed.

The input device 140 is an interface that receives input from outside, and is, for example, a keyboard, a mouse, a touch panel, a card reader, a voice input device.

The output device 150 is an interface that outputs various kinds of information such as a processing process or a processing result. The output device 150 is, for example, a display device (such as a liquid crystal monitor, a Liquid Crystal Display (LCD), and a graphic card) that visualizes the various kinds of information, a device (such as a sound output device (a speaker, or the like)) that vocalizes the various kinds of information, and a device (such as a printing device) that converts the various kinds of information into characters. For example, the information processing device 100 may input information to other devices or output information from other devices via the communication device 160.

The communication device 160 enables communication between the information processing device 100 and other devices. The communication device 160 is a wired or wireless communication interface that enables communication between the information processing device 100 and other devices via a communication unit such as a Local Area Network (LAN), a Wide Area Network (WAN), and the Internet. The communication device 160 is, for example, a Network Interface Card (NIC), a wireless communication module, a Universal Serial Interface (USI) module, and a serial communication module.

Functions of the pseudo image generative model G, the selection input unit I, the image extracting unit S, the first to third determination models D1 to D3, and the learning processing unit (not illustrated) are implemented by the processor 110 of the information processing device 100, for example, reading and executing a program stored in the main storage device 120.

The main storage device 120 and the auxiliary storage device 130 store various parameters, the first domain image 11, the pseudo second domain image 11g, the first area information 12, the second area information 22, the first extracted image 11c, the second extracted image 21c, and the first to third determination results A1 to A3 that define the pseudo image generative model G and the first to third determination models D1 to D3.

According to the machine learning system 1 in the present embodiment as in the above detailed description, the pseudo image generative model performs learning based on the second determination result A2 and the third determination result A3, in addition to the first determination result A1, so that the pseudo image generative model G can be prevented from generating the pseudo second domain image 11g that is a noise at the time of recognizing an object and is not expected at the beginning, and the pseudo image Generative model G can be made to efficiently learn so as to generate the pseudo second domain image 11g with high accuracy.

According to the machine learning system 1 in the present embodiment, the user does not need to perform complicated operations such as labeling, associating the first domain image 11 with the second domain image 21 at the time of preparing the learning data, and the learning of the pseudo image generative model can be efficiently performed.

The invention is not limited to the embodiments described above, and includes various modifications and equivalent configurations within the spirit of the claims. For example, the embodiments described above have been described in detail for easy understanding of the invention, and the invention is not necessarily limited to those having all the configurations described above. A part of the configuration of one embodiment can be replaced with the configuration of another embodiment, and the configuration of another embodiment can be added to the configuration of one embodiment. A part of the configuration of each embodiment may be subjected to addition, deletion and replacement of another configuration.

Some or all of the above-described configurations, functions, processing units, processing units, and the like may be implemented in hardware by designing, for example, an integrated circuit, or may be implemented in software by a processor interpreting and executing a program that implements respective functions.

Information such as a program, a table, and a file that implements each function can be stored in a storage device such as a memory, a hard disk, and a Solid State Drive (SSD), or a recording medium such as an Integrated Circuit (IC) card, an SD card, and a Digital Versatile Disc (DVD).

Control lines and information lines indicate what is considered necessary for explanation, and not all control lines and information lines in the products are shown. It may be considered that almost all the configurations are actually connected to each other.

What is claimed is:

1. A machine learning system that is an information processing system performing learning of a pseudo image generative model that is a machine learning model, the pseudo image generative model converting a first domain image into a pseudo second domain image, the first domain image being an image in a first domain and being obtained by capturing an image for an object to be recognized, the pseudo second domain image being an image obtained by simulating a second domain image that is an image in a second domain, the machine learning system, comprising:
   an input device;
   an output device;
   a memory; and a processor communicatively coupled to the input device, the output device and the memory, the processor configured to:

determine, using a first determination model stored in the memory, whether an input image is the second domain image;

determine, using a second determination model stored in the memory, whether a first extracted image that is an image extracted from the input image based on area information specifying an area where an object is presented in the input image is an image extracted from the second domain image based on area information specifying an area where an object is presented in the second domain image;

determine, using a third determination model stored in the memory, whether a second extracted image that is an image obtained by extracting, from the input image, an area where the object is not presented based on the area information is an image obtained by extracting, from the second domain image, an area where the object is not presented based on the area information;

generate the first extracted image, inputs the first extracted image into the second determination model, generate the second extracted image and inputs the second extracted image into the third determination model;

select and input, via the input device, either the pseudo second domain image or the second domain image into the first determination model, and select and input either a first combination of the pseudo second domain image and first area information that is the area information for the pseudo second domain image or a second combination of the second domain image and second area information that is the area information for the second domain image; and perform learning of the first determination model based on a first determination result that includes a result of a determination made by the first determination model and correct answer information for the determination, perform learning of the second determination model based on a second determination result that includes a result of a determination made by the second determination model and correct answer information for the determination, performs learning of the third determination model based on a third determination result that includes a result of a determination made by the third determination model and correct answer information for the determination, and performs learning of the pseudo image generative model based on the first determination result, the second determination result, and the third determination result.

2. The machine learning system according to claim 1, wherein
the first domain image is an image captured by an imaging device capable of acquiring information relating to a distance from the first domain image to a subject, and the area information is information acquired based on information relating to the distance.

3. The machine learning system according to claim 1, wherein
the area information is information acquired by performing image processing on the first domain image.

4. A domain conversion device, comprising:
a second input device configured to receive the first domain image;
a second processor configured to convert the first domain image, via learning, into the pseudo second domain image;
a second output device configured to send the pseudo second domain image to the machine learning system according to claim 1.

5. A machine learning method for performing learning of a pseudo image generative model that is a machine learning model that converts a first domain image into a pseudo second domain image, the first domain image being an image in a first domain and being obtained by capturing an image for an object to be recognized, the pseudo second domain image being an image obtained by simulating a second domain image that is an image in a second domain, and the machine learning method being implemented by an information processing device, the information processing device, including:
an input device;
an output device;
a memory; and
a processor communicatively coupled to the input device, the output device and the memory, the processor configured to:

determine, using a first determination model stored in the memory, whether an input image is the second domain image;

determine, using a third determination model stored in the memory, whether a first extracted image that is an image extracted from the input image based on area information specifying an area where an object is presented in the input image is an image extracted from the second domain image based on area information specifying an area where an object is presented in the second domain image;

determine, using a third determination model stored in the memory, whether a second extracted image that is an image obtained by extracting, from the input image, an area where the object is not presented based on the area information is an image obtained by extracting, from the second domain image, an area where the object is not presented based on the area information; and generate the first extracted image, inputs the first extracted image into the second determination model, generates the second extracted image and inputs the second extracted image into the third determination model, the machine learning method, comprising:
selecting and inputting either the pseudo second domain image or the second domain image into the first determination model, and selecting and inputting either a first combination of the pseudo second domain image and first area information that is the area information for the pseudo second domain image or a second combination of the second domain image and second area information that is the area information for the second domain image; and performing learning of the first determination model based on a first determination result that includes a result of a determination made by the first determination model and correct answer information for the determination, performing learning of the second determination model based on a second determination result that includes a result of a determination made by the second determination model and correct answer information for the determination, performing learning of the third determination model based on a third determination result that includes a result of a determination made by the third determination model and correct answer information for the determination, and performing learning of the pseudo image generative model based on the first determination result, the second determination result, and the third determination result.

\* \* \* \* \*